Feb. 19, 1963
H. C. WATERS
3,077,670
METHOD AND APPARATUS FOR MAKING A DIPMETER SURVEY OF A BOREHOLE
Filed Sept. 23, 1959
3 Sheets-Sheet 1
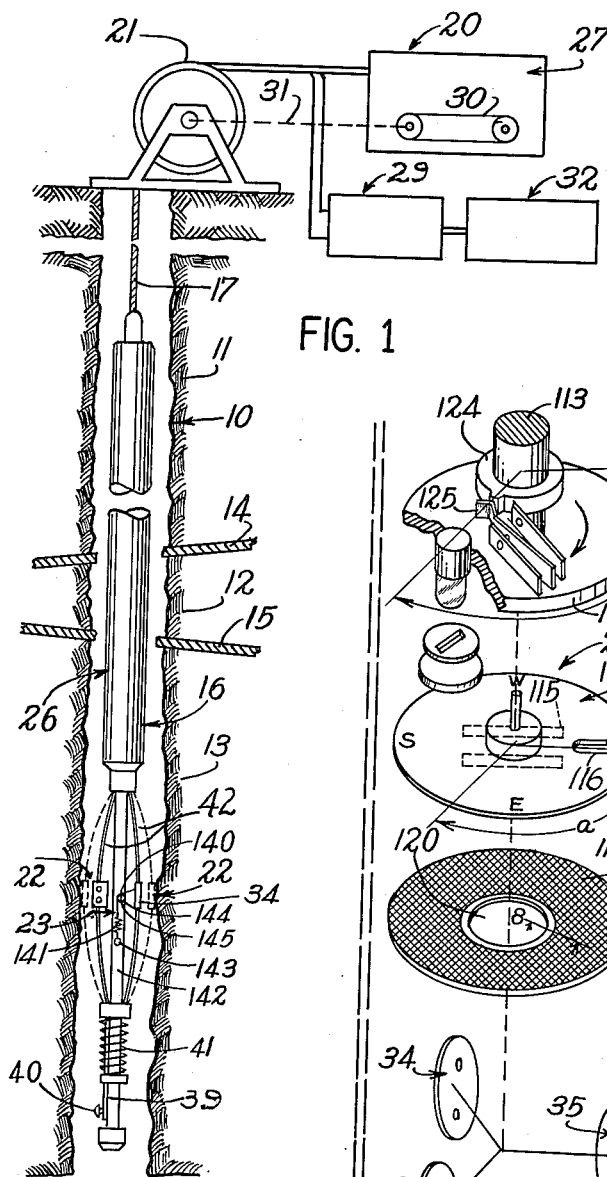
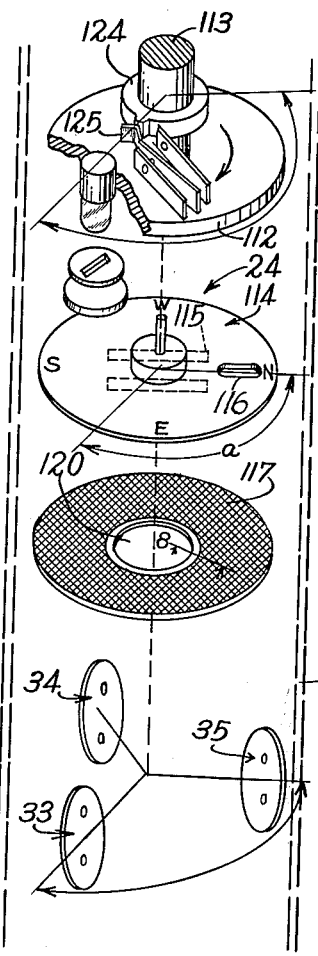
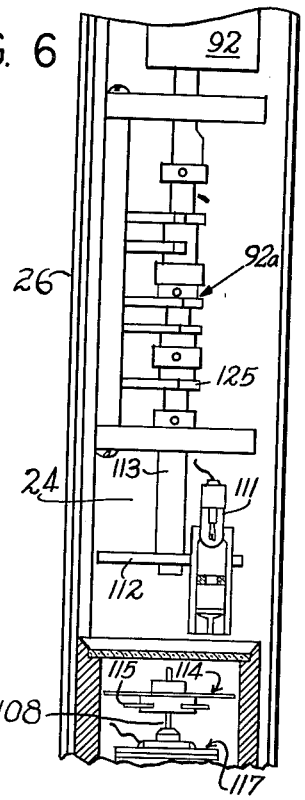
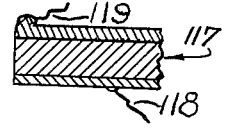
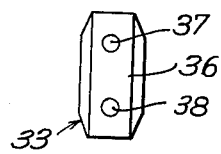
INVENTOR.
HENRY C. WATERS
BY
N M Esser
Atty.

INVENTOR.
HENRY C. WATERS
BY
N M Esser
Atty.

Feb. 19, 1963  H. C. WATERS  3,077,670
METHOD AND APPARATUS FOR MAKING A DIPMETER
SURVEY OF A BOREHOLE
Filed Sept. 23, 1959  3 Sheets-Sheet 3
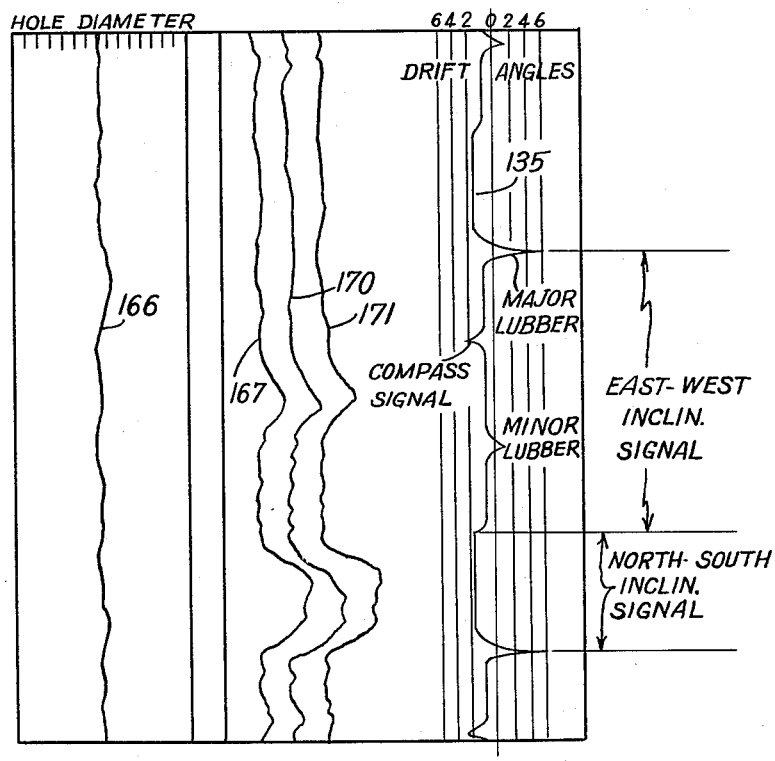
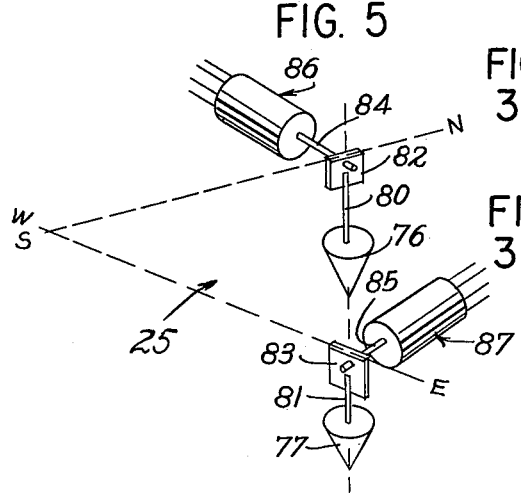
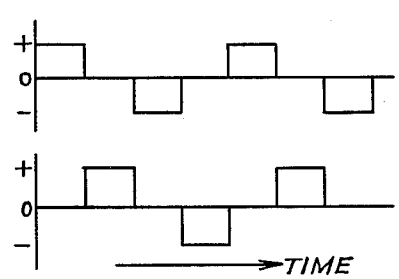
INVENTOR.
HENRY C. WATERS
BY NM Esser
Atty.

United States Patent Office 3,077,670
Patented Feb. 19, 1963

3,077,670
METHOD AND APPARATUS FOR MAKING A DIPMETER SURVEY OF A BOREHOLE
Henry C. Waters, Houston, Tex., assignor, by mesne assignments, to PGAC Development Company, Houston, Tex., a corporation of Texas
Filed Sept. 23, 1959, Ser. No. 841,854
24 Claims. (Cl. 33—178)

The present invention relates to a new and improved method and apparatus for making a dipmeter survey of a borehole, such as an oil well drilled in the earth, and more particularly to a method and apparatus for determining the angle and direction of dip of various earth strata penetrated by a borehole.

Dipmeter surveys provide valuable information concerning the angle and direction of dip of the interfaces formed by the different strata in subsurface earth formations. This information is useful in predicting the existence and extent of oil deposits contained within the formation. However, inasmuch as a relatively large number of different signals must be transmitted to the earth's surface to provide the necessary information for the survey, the cable extending between the subsurface logging tool and the recorder at the earth's surface conventionally includes a corresponding relatively large number of conductors. It will thus be seen that it would be advantageous in terms of improved signals and reducing cable weight and expense if a dipmeter apparatus could be devised which would employ a relatively small number of conductors.

It is therefore a primary object of the present invention to provide a method and apparatus for making a dipmeter survey of a borehole which is adapted to transmit the required number of signals to the earth's surface with relatively few conductors as compared to conventional methods and apparatus.

Another object of the present invention is to provide a new and improved method and apparatus for making a dipmeter survey of a borehole which is adapted to transmit eight (8) different information signals from a downhole tool to the earth's surface over a cable including not more than five (5) conductors and to record these signals using only five (5) galvanometers.

An additional problem presented in making a dipmeter survey with conventional methods and apparatus is the fact that the electron tubes required in conventional apparatus are not stable over the relatively large temperature range found in boreholes. This temperature range extends approximately between 100° F. and 375° F. As a consequence, the accuracy of the information signals developed by conventional apparatus may be adversely affected by extreme temperature conditions.

It is therefore a further object of the present invention to provide improved dipmeter apparatus in which all of the components are particularly stable over the relatively wide temperature range found in boreholes through the provision of structure eliminating the need for electron tubes.

Another object of the present invention is to provide an improved scanning system whereby only a single photosensitive cell is required in order to record the azimuth and drift angle of the tool.

A still further object of the present invention is to provide new and improved apparatus for making a dipmeter survey in which the information signals developed in the downhole tool may be transmitted to the earth's surface without amplification.

Another object of the present invention is to provide an improved dipmeter apparatus which employs a novel scanning system including a photosensitive cell adapted to develop accurate signals even under high borehole temperature conditions.

Still another object of the present invention is to provide a dipmeter apparatus which is rugged in construction, easy to operate, positive in developing and recording the required signals, and accurate under substantially all conditions found in a borehole.

In accordance with the present invention, the foregoing and other objects are realized by the provision of apparatus for simultaneously measuring a characteristic of the subsurface formations at three (3) or more non-aligned spaced apart points located along a plane extending transversely of the borehole. Three (3) separate curves are made continuously and simultaneously by recording the characteristics from the three (3) spaced apart points, and at the same time a continuous record is made of the borehole diameter and a record is made from which the angle of inclination of the borehole with respect to vertical and the azimuthal direction of the angle of inclination may be determined. All the curves are produced in side-by-side relationship on a single record so as to provide sufficient information to permit a determination of the angle and direction of the various interfaces traversed as the measuring points are moved along the borehole.

The power source for energizing the downhole tool circuits is a D.C. battery which is connected to current supply conductors through a motor driven commutator. The commutator construction is such that an alternating square wave current is developed in the current supply conductors. The downhole tool includes means for measuring the diameter of the borehole, the inclination of the borehole axis, and means for developing signals representative of the azimuth of the tool.

The circuits connecting the various components for developing the desired signals constitute an important feature of the present invention. The circuits include relay-operated switches, and motor driven cam operated switches interconnecting the components and the conductors in such a fashion that eight (8) different signals of interest may be transmitted to a recorder at the earth's surface over only five (5) conductors. The apparatus circuits also include a novel arrangement for developing a calibration signal in series with the inclinometer pendulum signals for calibrating the pendulum signals.

Another important feature of the apparatus is the improved scanning system for measuring the azimuth of the downhole tool employing a signal photovoltaic cell, a movable light source, and a magnetic compass card mounted between the light source and the photovoltaic cell. The compass card includes an aperture along a predetermined compass bearing whereby a signal is generated when the light source is rotated into alignment with the predetermined magnetic compass bearing. Means are also provided to develop another signal in response to the alignment of a movable reference point associated with the movable light source with a fixed reference point on the body of the tool.

The invention, both as to its organization and method of operation, together with further objects and advantages thereof will best be understood by reference to the following specification taken in connection with the accompanying drawings in which:

FIG. 1 is a diagrammatic view illustrating a borehole being logged by apparatus characterized by the features of the present invention;

FIG. 3 shows the time relationship between the current impulses developed by the apparatus shown in FIG. 2;

FIG. 4 is an enlarged fragmentary view illustrating one (1) of the electrode carrying pads employed in the apparatus illustrated in FIG. 1;

FIG. 5 is a diagrammatic view illustrating the operation of the inclinometer equipment employed in the apparatus shown in FIG. 1;

FIG. 6 is an elevational sectional view of a portion of the downhole tool illustrated in FIG. 1 showing elements of the scanning system of the present invention;

FIG. 7 is a perspective diagrammatic view of the scanning system shown in FIG. 6 illustrating its method of operation;

FIG. 8 is a fragmentary elevational sectional view of the photovoltaic cell employed in the scanning system illustrated in FIG. 7 taken along line 8—8 of FIG. 7; and FIG. 9 shows a typical section of the record produced by the apparatus illustrated in FIG. 1 containing all of the curves appearing in side-by-side relationship.

Figure 2:
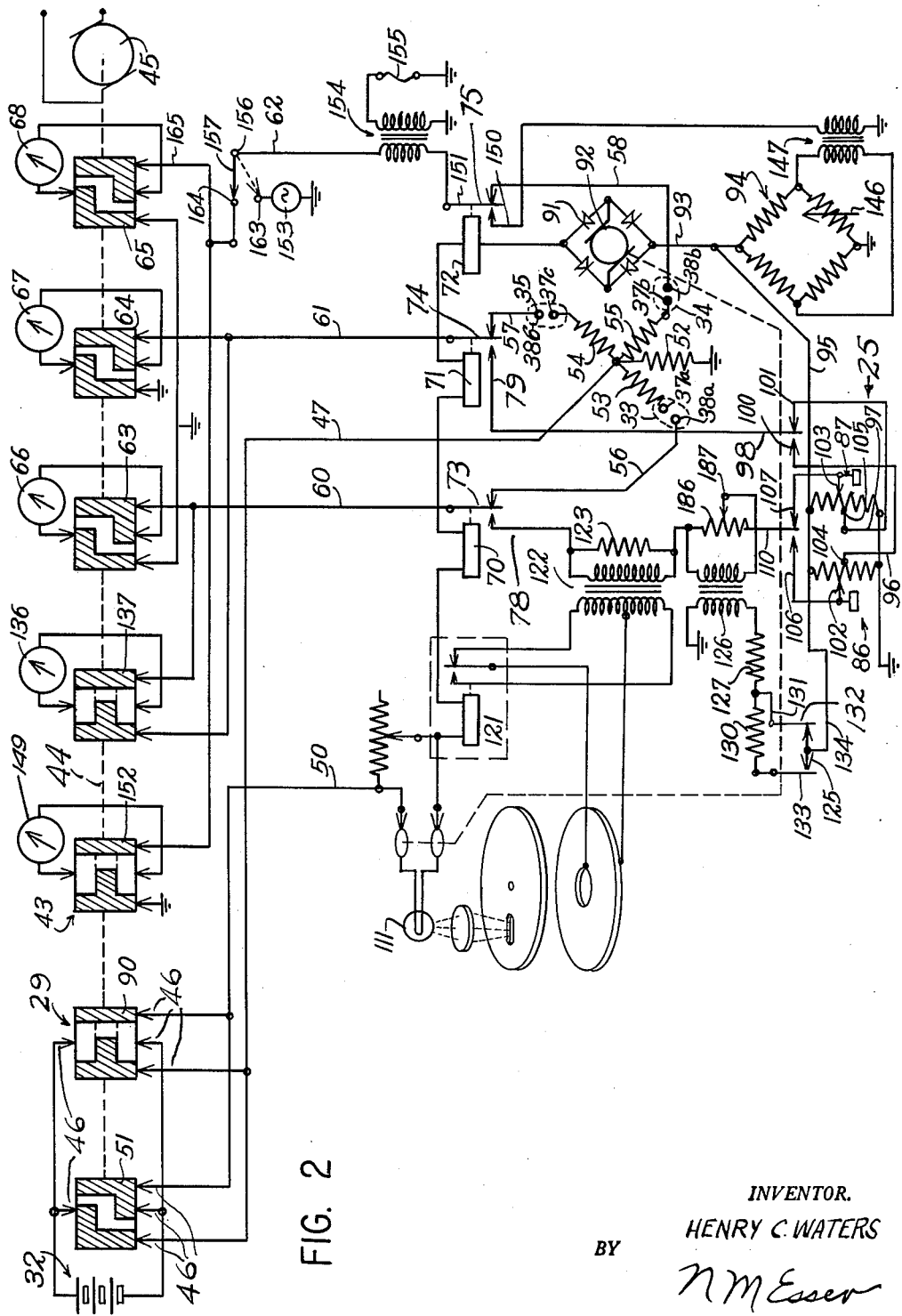
FIG. 2 is a schematic view illustrating the electrical circuits involved in the operation of the apparatus shown in FIG. 1 with certain of the components being shown in diagrammatic form to facilitate the illustration.

Referring now to the drawings and more particularly to FIG. 1 thereof, the present invention is there illustrated for use in logging a borehole 10 which extends downwardly from the earth's surface through subterranean formation indicated by appropriate cross-hatching. These formations include a plurality of strata 11, 12 and 13 bounding interfaces 14 and 15. The interfaces 14 and 15 are in the form of bedding planes which pass through the borehole 10 and in view of the fact that the borehole is very small in diameter as compared to the lateral extent of the interfaces 14 and 15, it will be presumed that all the points of intersection between each of the interface planes and the borehole lie in the same plane. The borehole 10 may be filled at least partially with a fluid (not shown) such as drilling mud generally employed in drilling operations.

For the purpose of making a dipmeter survey of the borehole 10 to provide information concerning the angle and direction of dip of the interfaces 14 and 15 a downhole tool indicated generally by the reference character 16 is adapted to be lowered into the borehole upon the lower end of a cable 17 extending through the borehole 10 from the downhole tool to surface equipment indicated generally by the reference numeral 20. The cable 17 in addition to supporting the downhole tool 16, has a plurality of conductors, described in detail below, insulated from each other and from the outer sheath of the cable 17. In order to facilitate the raising and lowering of the downhole equipment 16, the cable 17 may be trained over a motor driven sheave 21 or the like which may be rotated in either direction in order to effect the raising or lowering of the downhole tool.

The downhole tool includes a plurality of spaced apart measuring or sensing elements 22 to be described more fully hereinafter, and a caliper system 23. The tool also includes a housing 26 enclosing azimuth measuring apparatus indicated generally by reference numeral 24 (see FIG. 6), and inclinometer measuring apparatus indicated generally by reference numeral 25 (see FIG. 5) to determine the magnitude of the angle of inclination of the borehole with respect to vertical, commonly referred to as the drift angle, and its azimuth, and the electrical circuits for the downhole tool.

The surface equipment includes recording apparatus 27 which receives signals via the cable 17 from the downhole tool 16 and produces a plurality of curves upon recording medium 30. The recording apparatus 27 may be of any type conventionally employed and may for example include a plurality of recording galvanometers for directing light beams upon a light sensitive recording medium and for controlling the movements of these light beams so that visible curves appear in side-by-side fashion on the medium. The recording medium 30 is preferably driven by mechanism indicated schematically by broken line 31 in order to correlate the curves appearing on the recording medium with the depth of the downhole tool 16 in the borehole 10. The surface equipment 20 further includes a power supply 32 and a switching mechanism 29 connected to the downhole tool 16 as will be described more fully hereinafter. The recording apparatus 27 receives a signal from the caliper system 23 to produce a curve on the medium 30 which is representative of the diameter of the borehole 10 at all the points traversed by the downhole tool 16. The recorder 27 also receives three signals from the measuring or sensing elements 22 and utilizes these three (3) signals to produce three (3) curves respectively representative of the characteristics of the earth formations measured by these sensing elements. The recording apparatus 27 also receives inclinometer signals from the inclinometer device 25 and an inclinometer calibrating signal and these signals are combined to produce a signal curve on the recording medium 30 representative of the direction and angle of inclination of the borehole 10.

Generally in logging a borehole the downhole tool 16 is lowered to a predetermined depth with the sensing elements 22 held in their retracted position illustrated in solid line in FIG. 1. It will be observed in referring to FIGS. 1, 2 and 7 that three (3) sensing elements 22 are provided and these are individually identified by reference numerals 33, 34 and 35. The sensing elements may be used to gather any type of information conventionally employed to determine the angle and direction of the dip and strike of the subsurface interfaces such as, for example, resistivity, natural earth potential or acoustical properties. In the form of the invention illustrated, however, the sensing elements are used in an arrangement for determining the electrical resistivity of the formations adjacent to the borehole 10. Each of the sensing elements includes an insulating pad 36. The pads are equally spaced and are located at positions displaced 120° about the axis of the downhole tool 16. As is best illustrated in FIG. 4, each insulating pad 36 is provided with a pair of vertically spaced apart openings respectively accommodating a current electrode 37 and a measuring electrode 38. These electrodes are pressed into engagement with the walls of the borehole when the logging tool operator at the earth's surface releases the pads 36 by electrically firing ignitors 155 in FIG. 2 which expel a releasing plug 40. The firing circuit is described in detail hereinafter. On expulsion of the plug 40 a thrust spring 41 forces the pad arms 42 respectively carrying the three (3) insulating pads 36 outward to assume the positions shown in broken line in FIG. 1 with the pads 36 pressed against the borehole wall.

Turning now to FIG. 2, the power supply 32 is a D.C. battery of suitable capacity, which is connected to the current supply conductors through the medium of switching mechanism 29. Switching mechanism 29, which is generally similar to that illustrated and described in U.S. Patent No. 2,779,912 granted January 29, 1957 to the applicant, includes a commutator indicated generally by reference numeral 43 comprising a plurality of commutating sections. The commutating sections of commutator 43 are rotated in synchronism due to the fact that they are carried upon a common shaft 44 driven by a motor 45. Each of the commutating sections includes a pair of spaced electrically insulated conducting portions illustrated by cross-hatching and an insulating portion which is not cross hatched. To provide current flow from and to the respective commutating sections, conductors are connected to brushes 46 in engagement with diametrically opposed portions on the outer periphery of the commutating sections. It will be noted that the central brush, top and bottom, of each commutator section alternately comes in contact first with one of the conduction portions, next with the insulating portion, and then with the other conducting portion. On the other hand, the outside brushes of each commutator section are in continuous engagement with their respective conducting portions. Thus, as the respective commutating sections are rotated the brushes are sequentially connected positive to negative, to the insulating portion, and then, negative to positive.

In carrying out resistivity measurements commutated current from power supply 32 is supplied to conductors 47 and 50 from commutator section 51. This is essentially a square wave current and flows only one-half of the time as illustrated in FIG. 3a. This current is applied through conductor 47 and through a resistor 52 to ground on the body of the tool. Three (3) resistors 53, 54 and 55 are connected together at one (1) end and to the positive side of resistor 52. The resistors 53, 54 and 55 bleed off a small amount of current through the current electrodes 37. The current through the electrodes 37 creates an electric field in the formations adjacent to the pads 36. The three (3) measuring electrodes 38a, 38b, and 38c may be placed at short distances, for example, approximately one (1) inch from the respective current electrodes 37a, 37b, and 37c for sampling the electric field behind each pad and obtaining indications of formation resistivity changes. Voltage measurements are made from measuring electrode 38a to ground, 38b to ground, and 38c to ground by means of lines 56, 57 and 58, and signal transmitting conductors 60, 61 and 62 respectively. The commutator 43 includes three (3) commutator measuring sections 63, 64 and 65 which are synchronized with commutator current section 51 and are used to rectify the signals from electrodes 38a, 38b and 38c respectively before recording with galvanometers 66, 67 and 68. It should be noted here that the current from commutator section 51 is of relatively low magnitude and is not large enough to actuate relays 70, 71 and 72 in series with conductor 50 which operate movable switch blades 73, 74 and 75, which respectively connect line 56 to conductor 60, line 57 to conductor 61, and line 58 to conductor 62. Accordingly, during the period that current is flowing from commutator section 51 the relay operated switch blades 73, 74 and 75 are in the resistivity signal transmitting position shown in FIG. 2.

Turning now to the means for measuring the magnitude of the angle of inclination of the borehole with respect to vertical and the azimuthal direction of the angle of inclination, the downhole tool inclinometer apparatus 25 is shown in FIG. 5 and also diagrammatically shown in FIG. 2. The inclinometer apparatus 25 includes a pair of pendulum masses 76 and 77 respectively suspended upon the lower ends of pendulum arms 80 and 81 which have their upper ends mounted for rotation upon hinge assemblies 82 and 83. The hinge assemblies in turn actuate operating shafts 84 and 85 of a pair of center tapped potentiometers 86 and 87 mounted at right angles to each other. The hinge assemblies 82 and 83 permit movement of the 2 pendulums at right angles to the direction of rotation of their corresponding potentiometer shafts without causing rotation of these shafts.

The pendulum masses 76 and 77, their support arms and their corresponding hinge assemblies are mounted so that the pendulum mass 76 swings through an arc lying in the north-south plane while the pendulum mass 77 swings through an arc lying in the east-west plane. In the event that the borehole is inclined so that the axis of the tool is other than vertical, the movements of the two pendulum masses 76 and 77 correspond to the respective components of the north-south and east-west directions of the angle of borehole inclination. The pendulum mass 76 thus rotates the shaft 84 in such manner that the output of the potentiometer 86 is indicative of the direction and magnitude of the north-south component of the angle of inclination and, in similar manner the pendulum mass 77 turns the shaft 85 so that the potentiometer 87 develops a signal corresponding to the direction and magnitude of the angle of inclination in the east-west direction.

The measurement of the direction and magnitude of the drift angle is made while current is flowing between conductors 47 and 50 from commutator current section 90. This current is also of a square wave nature and flows only one-half the time. The wave shape of this current is illustrated in FIG. 3b. The conductor 50 is serially connected to the operating coils of relays 70, 71 and 72 mentioned above. Also serially connected to conductor 50 is a full wave rectifier 91 which energizes a D.C. motor 92. A line 93 extends from full wave rectifier 91 to a caliper survey bridge 94 described in detail hereinafter. A line 95 connects line 93 to the parallel connected potentiometers 86 and 87. The potentiometers 86 and 87 respectively include center taps 96 and 97 which are respectively connected to a pair of fixed contacts 100 and 101, which respectively cooperate with a movable switch blade 98 which is cam operated by means of motor 92. The potentiometers 86 and 87 also include wiper arms 102 and 103 which are respectively controlled by the swinging movement of the pendulums 76 and 77. When the pendulums are vertical, the wiper arms 102 and 103 are at the center points 104 and 105 respectively. If the pendulums swing their respective wiper arms to opposite sides of the center tap, the voltage from center tap to wiper arm changes polarity. In other words, both the magnitude of the borehole drift and its direction can be determined by measuring the voltages from center tap to wiper arm of the respective potentiometers 86 and 87. The wiper arms 102 and 103 are electrically connected to a pair of fixed contacts 106 and 107. The fixed contacts cooperate with a movable switch blade 110 which is pushed against contact 106 or against contact 107 by means of one of a series of rotating cams 92a carried on a shaft 113 (FIG. 6) driven by the motor 92.

In the illustrated circuit arrangement the electrical characteristics of the various components are chosen so that the current from commutator current section 90 is sufficiently large to energize the relays 70, 71 and 72. This current reaches the potentiometers 86 and 87 through lines 93 and 95. When current is passing through the potentiometers, the voltages indicating the borehole drift and its direction may be measured through conductors 60 and 61 when the relays 70 and 71 are energized engaging movable switch blades 73 and 74 with fixed contacts 78 and 79 respectively. The two pendulum signals are alternately placed on conductors 60 and 61 by alternately engaging movable switch blade 98 with fixed contacts 100 or 101 and movable switch blade 110 with fixed contacts 106 or 107 by means of the rotating cams 92a driven by motor 92. Describing the respective connections in detail, the north-south pendulum signal is placed on conductors 60 and 61 by engaging movable switch blade 98 with fixed contact 100, while at the same time engaging movable switch blade 110 with fixed contact 106. Similarly, the east-west pendulum signal is then placed on conductors 60 and 61 by engaging movable switch blade 98 with fixed contact 101, while simultaneously engaging movable switch blade 110 with fixed contact 107. The respective signals are readily differentiated at the surface by having different dwell times for the two (2) signals by means of appropriate variations in the respective cams. In the illustrated arrangement the cam controlling the east-west inclinometer signal has a larger dwell time than the cam controlling the north-south inclinometer signal. This is illustrated in FIG. 9. The magnitude of the pendulum signals is also calibrated in degrees by adjusting the galvanometer 136 which receives the inclinometer pendulum signals from conductors 60 and 61. The two pendulum signals carried over conductors 60 and 61 are fed into commutator measuring section 137 for rectification before being recorded by galvanometer 136.

The azimuth of the tool may be determined by measuring a compass signal and a lubber line signal. The azimuth measuring apparatus 24 shown in FIGS. 6 and 7 includes a light source consisting of a bulb 111 which is suitably mounted on a disc 112 carried on the shaft 113 which is driven at a uniform rate of speed by the motor 92. As indicated above, the shaft 113 also carries the various cams used to move the cam operated switch blades mentioned above mounted in the down hole tool. The azimuth measuring apparatus also includes a magnetic compass card 114 which has mounted thereto and underneath the card (see FIGS. 6 and 7) a pair of horizontally disposed north-seeking permanent magnets 115. The compass card 114 pivots about a shaft 108 which is pivotably mounted so that the compass card 114 freely rotates under the influence of the earth's magnetic field. The compass card 114 also includes an aperture 116 which is centered along a predetermined compass bearing which may advantageously be magnetic north. Mounted below the compass card 114 in fixed relationship to the downhole tool is a photosensitive device 117. The photosensitive device 117 may advantageously be a photovoltaic cell of the silicon p-n type. Photovoltaic cells of this type are unusually stable over a wide range of temperature conditions. In particular, the illustrated and described photovoltaic cell has provided excellent results in boreholes having temperatures in the range of 100° F. to 375° F. The photovoltaic cell 117 may advantageously be of a ring shape having a central aperture 120. In the illustrated embodiment, the cell 117 has a relatively large surface area having an outside diameter approximating 1⅝″ with the central aperture 120 approximating ½″ in diameter. FIGS. 7 and 8 illustrate the construction of the photovoltaic cell 117 in detail. It includes a negative lead 118 connected to the lower face of the cell and a positive lead 119 connected at the periphery of the central aperture 120. The illustrated photosensitive device 117 because of its described structure is adapted to develop a relatively strong signal which may be transmitted directly to the surface of the earth without any need for subsurface amplification.

The magnet north compass signal is obtained by scanning the compass 114 with the rotating beam of light from bulb 111. The filament of bulb 111 is in series with conductor 50 and the square wave current flowing in this conductor illuminates the bulb. As the bulb is driven in rotation by the motor shaft 113, the light from the bulb 111 impinges upon the photosensitive cell 117 for the instant during each revolution when the aperture 116 is aligned with the light source. The cell is energized by the light beam during that interval when the light beam passes through the aperture in the compass card 114. The signal from the cell 117 at this moment is of a D.C. nature. This D.C. signal is converted to a square wave by means of a conventional chopper 121 in FIG. 2 energized by current from commutator section 90. Consequently, it has the same wave shape (see FIG. 3b) as this current. This square wave signal is placed in series with the pendulum signals by means of a transformer 122 and a resistor 123 in parallel relation therewith. The curve 135 of FIG. 9 illustrates the compass signal in conjunction with the inclinometer pendulum signals.

The lubber line signal is controlled by a cam 124 carried on the rotating shaft 113. The cam 124 operates a movable switch blade 125 which controls a circuit in series with transformer 126 which in turn is connected in series with a transformer 122 as shown in FIG. 2. The secondary of transformer 126 is connected in series with a resistor 127 and a resistor 130. A line 131 extends from between the resistors 127 and 130 to a fixed contact 132. Another fixed contact 133 is connected to the free end of resistor 130. The movable switch blade 125 is operated by projections on its associated cam 124 to alternately close against fixed contacts 132 and 133. Cam 124 has a projection aligned with light source 111 which in turn is aligned with a fixed reference point on the tool consisting of the sensing element 33. Cam 124 also includes another projection (not shown) 180° away from the illustrated projection which also operates switch blade 125. Accordingly, a sharp signal designated the major lubber signal shown on curve 135, FIG. 9, is developed when movable light source 111 is aligned with the fixed reference point consisting of sensing element 33, and a second sharp signal of smaller magnitude designated the minor lubber signal on curve 135 in FIG. 9 is developed when the light source is 180° away from the sensing element 33. It will be seen that the two (2) lubber signals will be different in magnitude because of the difference in resistance when switch blade 125 is connected to fixed contact 132 as opposed to when it is in engagement with fixed contact 133. A line 134 is connected to movable switch blade 125 and to line 95 which is connected to potentiometers 86 and 87. The polarity of the lubber signals transmitted over line 134 is always in the negative direction and opposite to the compass signal discussed above; consequently the compass signal and the lubber signals are readily distinguishable as shown on curve 135 of FIG. 9. It will be seen by the preceding discussion that alternatingly, one or the other of the two pendulum signals, the compass signal and the lubber line signals are placed in series with each other and transmitted to the earth's surface over conductors 60 and 61 by the circuit arrangement shown in FIG. 2. In addition to these signals, it will be recalled from the above description (the sentence bridging pages 9 and 10) that conductors 60 and 61 also transmit two signals indicative of the resistivity characteristic of the earth formations. Therefore, six (6) separate signals are transmitted over this single pair of conductors. The curve 135, as shown in FIG. 9, illustrates the appearance of the combined inclinometer pendulum signal, lubber line signals, and compass signal as they will appear on the log. All of these signals require only one galvanometer and one commutator section which are 136 and 137 respectively.

The illustrated construction includes a special feature in that means are provided to obtain a constant calibration check of the two pendulum signals. The lubber line signals which are actuated by cam 124 on the rotating shaft 113 and which tell us where the moving light source 111 is relative to sensing element 33, are constant signals at all times. These signals are adjusted by means of the resistor 186 and the movable contact 187 connected to it so that, for example, the major lubber signal represents a predetermined angular displacement of the pendulum, for example, either a 1°, 2°, 3° etc. angular displacement of the pendulum. When this adjustment is made, it is only necessary to compare the magnitude of the pendulum signal with the magnitude of the lubber signal in order to determine exactly the angular displacement of the pendulums from vertical.

As indicated above, the apparatus of the present invention is adapted to provide a continuous recording of the borehole diameter in order to facilitate interpretation of the curves produced by the sensing elements 33, 34 and 35. The caliper measuring equipment may be of any suitable kind known in the art. In the form shown on the drawings (FIGS. 1 and 2), however, one (1) of the sensing elements, for example, the sensing element 34 illustrated in FIG. 1 has a flexible cable 140 attached at one end to the backing plate of pad 36 associated with sensing element 34, and its other end secured to the upper end of a spring 141. The lower end of the spring is fixedly secured to a mandrel 142 as indicated at 143 in FIG. 1. The flexible cable 140 is trained over a pulley 144 which turns in response to movement of the sensing element 34 as the diameter of the borehole varies. The pulley 144 is mounted upon a shaft 145 connected to drive a caliper rheostat 146 (FIG. 2) which comprises one (1) leg of a Wheatstone bridge forming part of the caliper system 23. The described construction enables the bridge unbalance to be constantly measured and recorded as a function of hole diameter. The square wave current from commutator current section 90 is carried by conductor 50 to the bridge 94. Thus a square wave signal from the bridge 94 is fed to a transformer 147. The output of transformer 147 is fed to conductor 62 by means of fixed contact 150 and movable switch arm 151 controlled by the operation of relay 72 when current from commutator current section 90 energizes the relay. The caliper signal is rectified by means of commutator measuring section 152 which is synchronized with commutator current section 90 and recorded by galvanometer 149.

Referring again to FIG. 2 the circuit illustrated therein includes a firing circuit for firing the tool open at a predetermined depth level. The firing circuit includes a 60 cycle A.C. generator 153, a 60 cycle transformer 154 having its primary in series with conductor 62, and an ignitor 155 which is connected in series with the secondary of the transformer 154. The circuit also includes a single-pole double-throw switch 156 connected to conductor 62, which has a movable switch blade 157 which may be connected to a fixed contact 163 in series with generator 153 and a fixed contact 164 connected to a line 165, which in turn is connected to brushes respectively connected to commutator sections 65 and 152. The tool is fired by placing movable switch blade 157 in engagement with contact 163. This will cause secondary current from the transformer 154 to ignite the ignitor 155, igniting explosive powder behind plug 40, propelling the plug 40 radially outwardly to release a locking bar 39 restraining spring 41. The pads 36 will then be released to seat against walls of the borehole as described above.

Summarizing, the above described arrangement thus allows eight (8) different signals to be recorded on a five (5) conductor cable with the use of only five (5) galvanometers. These signals consist of three (3) resistivity curve signals, two (2) pendulum signals, lubber line signals, a compass signal and a caliper signal. A typical set of traces or curves including these signals is illustrated in FIG. 9 wherein curve 166 represents the caliper signal indicating the borehole diameter, curves 167, 170 and 171 represent the three (3) resistivity curves from the sensing elements 33, 34 and 35, and curve 135 is a combined curve including the two (2) pendulum signals, the two (2) lubber line signals, and the compass signal as indicated on FIG. 9.

In view of the foregoing it will be observed that the apparatus of the present invention is adapted to provide all the information necessary to determine the direction and angle of dip of the subsurface interfaces while utilizing a cable employing a minimum number of conductors extending between the surface equipment and the downhole tool.

While a particular embodiment of the invention has been described and illustrated it will be recognized that many modifications will become readily apparent to those skilled in this art and it is, therefore, contemplated by the appended claims to cover all such modifications as fall within the true spirit and scope of the present invention.

I claim:

1. In a method of logging a borehole to determine the dip of at least one stratum in the earth formations surrounding the borehole, the steps of obtaining measurements from a plurality of spaced apart points located in proximity to the walls of the borehole with each of the measurements obtained being characterized by variations corresponding to changes in the earth formations, moving said points in unison longitudinally through the borehole and past said stratum, continuously recording the measurements obtained as said points are moved, uniformly moving a scanning means relative to said points, developing a first signal when the scanning means is in alignment with a reference point which is fixed in relation to one of said spaced apart points, developing a second signal when the scanning means is in alignment with a predetermined compass bearing, developing a third signal indicative of the borehole angle of inclination from the vertical and its azimuthal direction, and recording all of the signals as a combined trace in correlation with the recording of the measurements.

2. In a tool movable through a borehole, apparatus for developing relatively strong signals adapted for direct transmission to the earth's surface indicating the azimuth of the tool, said apparatus including a light sensitive device of the photovoltaic type, a uniformly moving light source mounted so that its light may directly impinge on said light sensitive device, and a member mounted for rotation upon the tool between the source and the device for controlling the passage of light to said device, the rotation of the member being controlled by a magnet under the influence of the earth's magnetic field.

3. In an inclinometer apparatus for measuring the magnitude and azimuthal direction of the angle of inclination of a borehole, a downhole tool including a first pendulum mounted for swinging movement in a first plane and a second pendulum mounted for swinging movement in a second plane extending normal to said first plane, means for moving said tool through the borehole so that the tool tilts with respect to the pendulums in response to changes in the magnitude or azimuthal direction of said angle of inclination of the borehole, means actuated in response to the tilting of the tool for measuring the direction and magnitude of the tilting with respect to each pendulum in order to provide first and second components indicative of the magnitude and azimuthal direction of the angle of inclination of the borehole with respect to the first and second planes, respectively, and means for developing signals indicating the azimuth of the tool during the movement of the tool through the borehole, said azimuth signal developing means including a light sensitive device, a movable light source, means for closing a circuit when the light source is aligned with a fixed reference point on the tool, and a compass member mounted for rotation upon the tool between the source and the device for controlling the passage of light to the device.

4. In an inclinometer apparatus for measuring the magnitude and azimuthal direction of the angle of inclination of a borehole, a downhole tool including a first pendulum mounted for swinging movement in a first plane and a second pendulum mounted for swinging movement in a second plane extending normal to said first plane, means for moving said tool through the borehole so that the tool tilts with respect to the pendulums in response to changes in the magnitude or azimuthal direction of said angle of inclination of the borehole, means actuated in response to the tilting of the tool for measuring the direction and magnitude of the tilting with respect to each pendulum in order to provide first and second components indicative of the magnitude and azimuthal direction of the angle of inclination of the borehole, caliper means located on said tool in fixed preoriented position with respect to said pendulums for developing signals representing changes in borehole diameter, and means for developing signals indicating the azimuth of the tool during the movement of the tool through the borehole, said azimuth signal developing means including a light sensitive device, a movable light source, means for operating a switch when the light source is aligned with a fixed reference point on the tool, and a compass member mounted for rotation upon the tool between the source and the device for controlling the passage of light to the device.

5. In apparatus for logging a borehole to determine the dip of at least one stratum in the earth formation surrounding the borehole, the combination of a movable light source, means to move the light source, light sensitive means for developing a relatively strong signal comprising a photovoltaic cell mounted to receive direct impingement of light from said light source, a circuit for energizing signal recording means without signal amplification connected to said cell, and a magnetic compass card interposed between said light source and said cell, and card having an aperture along a predetermined compass bearing to enable light to directly impinge on the cell when the light source is aligned with the aperture facilitating the development of signals indicative of the apparatus orientation relative to magnetic north.

6. In an apparatus for logging a borehole to determine the dip of at least one stratum in the earth formations surrounding the borehole, the combination of a downhole tool including at least three spaced apart sensing elements, means biasing said sensing elements into engagement with the walls of the borehole, means for moving said tool through the borehole so that said sensing elements pass along the walls of the borehole, means for developing from each sensing element characteristic signals representing at least one characteristic of the earth formations varying from stratum to stratum, caliper means in said tool responsive to the movement of at least one of said sensing elements resulting from changes in borehole diameter for developing caliper signals indicative of the variations in borehole diameter, an inclinometer apparatus on said tool for developing inclinometer signals indicative of the direction and inclination of the borehole, said sensing elements, said caliper means and said inclinometer apparatus being mounted in fixed, preoriented positions relative to the tool, means for developing signals indicative of the azimuth of the tool during its movement through the borehole including a light sensitive device, a movable light source, means for closing a circuit when the light source is aligned with a fixed reference point on the tool, and a compass member mounted for rotation upon the tool between the source and the device for controlling the passage of light to the device, means for developing a combined signal from said inclinometer signals and said signals indicative of the azimuth of the tool and means for recording said caliper signals, said characteristic signals, and said combined signal.

7. In apparatus including a tool movable through a borehole, a power source, a recorder at the earth's surface for recording information signals relating to characteristics of the earth formations varying from stratum to stratum as the tool is moved along the walls of the borehole, means connecting the tool to the recorder including a cable containing not more than five conductors, three of said conductors being signal transmitting conductors, eight different signal sources for developing signals relating to characteristics of the earth formations traversed by the borehole, and a signal transmission system for transmitting eight different information signals from said sources to the recorder over said cable containing only five conductors, said signal system including at least three pairs of contacts respectively connecting to different ones of said sources for developing information signals, and means for respectively connecting said three signal transmitting conductors to said contact pairs by alternately and sequentially connecting the respective signal transmitting conductors to the individual contacts forming each said pair.

8. In apparatus according to claim 7 wherein the means for connecting the signal transmitting conductors to the contacts connected to the signal sources includes relay-operated switch blades and a relay sequentially connected to said power source by said commutator.

9. In apparatus as claimed in claim 7, in which the signal transmission system includes motor driven cams and at least one cam operated switch blade for alternately and sequentially connecting one of said contacts to two of said signal sources.

10. In apparatus including a tool movable through a borehole, a power source, a recorder at the earth's surface for recording information signals relating to characteristics of the earth formations varying from stratum to stratum as the tool is moved along the walls of the borehole, means connecting the tool to the recorder including a cable containing not more than five conductors, three of said conductors being signal transmitting conductors, and at least one of said conductors being a current supply conductor, eight different signal sources for developing signals relating to characteristics of the earth formations traversed by the borehole, and a signal transmission system for transmitting eight different information signals from said sources to the recorder over said cable containing only five conductors, said signal system including at least three pairs of contacts respectively connecting to different ones of said sources for developing information signals, and connecting means for respectively connecting said three signal transmitting conductors to said contact pairs by alternately and sequentially connecting the respective signal transmitting conductors to the individual contacts forming each said pair, said connecting means including a commutator having commutating sections for connecting the power source to said current supply conductor.

11. In apparatus according to claim 10, in which there are two current supply conductors, and the commutator has two current commutating sections which are alternatingly connected in sequence to the current supply conductors.

12. In apparatus according to claim 10 in which the power source is a source of direct current power and the commutator sections are shaped and insulated from each other so that the commutator converts the current to an alternating wave form in connecting the power source to a current supply conductor and is adapted to rectify alternating current information signals developed in the borehole.

13. In apparatus according to claim 12 in which the means for connecting the respective signal transmitting conductors alternately to the source contacts includes a relay having an operating coil in series with said current supply conductor.

14. In apparatus according to claim 13 in which two of the signal transmitting conductors are sequentially connected in series by said connecting means.

15. In apparatus according to claim 14 in which said two signal transmitting conductors are connected in series by means including motor driven cam operated switches.

16. In an apparatus for logging a borehole to determine the dip of at least one stratum in the earth formations surrounding the borehole, the combination of a downhole tool including at least three spaced apart sensing elements located in proximity to the walls of the borehole, means for moving said tool through the borehole, means for developing from each sensing element characteristic signals representing at least one characteristic of the earth formations varying from stratum to stratum, caliper means in said tool for developing caliper signals indicative of the variations in diameter of the borehole traversed by said tool and means including a scanning system employing not more than one photosensitive cell for developing and recording signals representative of the azimuth and drift angle of the tool during the movement of the tool through the borehole.

17. In an apparatus as claimed in claim 16 wherein the scanning system employs a rotating lamp, the photosensitive cell is a photovoltaic device having a flat ring-shaped surface which is sensitive to light throughout its entire area, and there is an apertured circular compass card mounted in concentric parallel relation with said photovoltaic cell between it and the rotating lamp so that light energy from said lamp may pass through the aperture in said compass card and directly impinge on the photosensitive cell.

18. In an apparatus according to claim 17 wherein the photosensitive cell is a photovoltaic device of the silicon p-n junction type which is adapted to develop a relatively strong signal which may be transmitted to the earth's surface without subsurface amplification throughout a borehole temperature range extending between 100° F. to 375° F.

19. In an inclinometer apparatus for measuring the magnitude and azimuthal direction of the angle of inclination of a borehole, a downhole tool including a first pendulum mounted for swinging movement in a first plane and a second pendulum mounted for swinging movement in a second plane extending normal to said first plane, means for moving said tool through the borehole so that the tool tilts with respect to the pendulums in response to changes in the magnitude or azimuthal direction of said angle of inclination of the borehole, a first variable signal source in the downhole tool controlled by said first pendulum for developing a first signal representing the direction and inclination of the borehole with respect to the first plane, a second variable signal source in the downhole tool controlled by said second pendulum for developing a second signal representing the direction and inclination of the borehole with respect to the second plane, movable scanning means, a compass signal source for developing a signal representing alignment of the scanning means with a predetermined compass bearing, a lubber line signal source for developing a signal representing alignment of the scanning means with a fixed reference point on the tool, at least three spaced apart sensing elements located in proximity to the walls of the borehole, means for developing from each of the sensing elements a characteristic signal representing at least one characteristic of the earth formations varying from stratum to stratum, a recorder at the earth's surface for recording all of said signals, means connecting the downhole tool to the recorder and including a cable containing a plurality of conductors, and a signal transmission system for transmitting said first and second signals, said compass signal, said lubber line signal, and two of said characteristic signals to the recorder over a single pair of said conductors.

20. In an inclinometer apparatus for measuring the magnitude and azimuthal direction of the angle of inclination of a borehole, a downhole tool including a first pendulum mounted for swinging movement in a first plane and a second pendulum mounted for swinging movement in a second plane extending normal to said first plane, means for moving said tool through the borehole so that the tool tilts with respect to the pendulums in response to changes in the magnitude or azimuthal direction of said angle of inclination of the borehole, a first variable signal source in the downhole tool controlled by the movement of the tool with respect to said first pendulum for developing a first signal representing the direction and inclination of the borehole with respect to the first plane, a second variable signal source in the downhole tool controlled by the movement of the tool with respect to said second pendulum for developing a second signal representing the direction and inclination of the borehole with respect to the second plane, a movable scanning means, a compass signal source, a lubber line signal source representing alignment of the scanning means with a fixed reference point on the tool, at least three spaced apart sensing elements located in proximity to the walls of the borehole respectively developing characteristic signals representing at least one characteristic of the earth formations varying from stratum to stratum, a recorder at the earth's surface for recording all of said signals, means for connecting the downhole tool to the recorder and including a cable containing a plurality of conductors, and a signal transmission system for transmitting both of said first and second signals, said compass signal, said lubber line signal, and two of said characteristic signals to the recorder over a single pair of said conductors, said transmission system including a pair of switch elements, said switch elements being respectively connected to said single pair of conductors for sequentially alternatingly connecting said single pair of conductors to two of said sensing elements and to said signal sources.

21. In an inclinometer apparatus for measuring the magnitude and azimuthal direction of the angle of inclination of a borehole, a downhole tool including a first pendulum mounted for swinging movement in a first plane and a second pendulum mounted for swinging movement in a second plane extending normal to said first plane, means for moving said tool through the borehole so that the tool tilts with respect to the pendulums in response to changes in the magnitude or azimuthal direction of said angle of inclination of the borehole, a first variable signal source in the downhole tool controlled by said first pendulum for developing a first signal representing the direction and inclination of the borehole with respect to the first plane, a second variable signal source in the downhole tool controlled by said second pendulum for developing a second signal representing the direction and inclination of the borehole with respect to the second plane, movable scanning means, and means including a calibrating signal source in the downhole tool for developing a signal for calibrating said first and said second signals, said calibrating signal being constant during the movement of the tool through the borehole.

22. In an inclinometer apparatus according to claim 21 in which the calibrating signal is actuated by means responsive to the alignment of a member which is rotatable relative to the tool with a fixed reference point on the tool.

23. In an inclinometer apparatus according to claim 22 in which the calibrating signal developing means include means for adjusting the calibrating signal to correspond to a predetermined angular displacement of the pendulums.

24. In an apparatus for logging a borehole to determine the dip of at least one stratum in the earth formations surrounding the borehole, the combination of a downhole tool including at least three spaced apart sensing elements located in proximity to the walls of the borehole, means for moving said tool through the borehole, means for developing from each sensing element characteristic signals representing at least one characteristic of the earth formations varying from stratum to stratum, caliper means in said tool for developing caliper signals indicative of the variations in diameter of the borehole traversed by said tool and means including a scanning system employing not more than one photosensitive cell for developing and recording signals representative of the azimuth and drift angle of the tool during the movement of the tool through the borehole, said scanning system including a light source, rotatable means for carrying said light source, means for generating a signal in response to the alignment of a reference point on said rotatable means with a reference point in fixed relation to one of said sensing elements, a single photovoltaic cell of the p-n junction type mounted in fixed relation to said tool and spaced from said light source, magnetic compass means including a compass face freely rotating under the influence of the earth's magnetic field mounted between said light source and said photovoltaic cell, said compass face having an aperture therein along a predetermined compass bearing adapted to permit light from the light source to pass through the face and impinge upon the photovoltaic cell, and a circuit connected to said photovoltaic cell adapted to transmit a signal representing alignment of the light source and the aperture.

References Cited in the file of this patent
UNITED STATES PATENTS

| | | |
|---|---|---|
| 2,415,221 | Savitz | Feb. 4, 1947 |
| 2,640,275 | Boucher | June 2, 1953 |
| 2,876,413 | Saurenman et al. | Mar. 3, 1959 |
| 2,899,633 | Smith et al. | Aug. 11, 1959 |